United States Patent [19]
Knapp

[11] Patent Number: 6,157,503
[45] Date of Patent: Dec. 5, 2000

[54] HIGH PERFORMANCE OPTICAL FILTERS SUITABLE FOR INTENSE ULTRAVIOLET IRRADIANCE APPLICATIONS

[75] Inventor: Jamie Knapp, Mendon, Mass.

[73] Assignee: Thermo Vision Corporation, Franklin, Mass.

[21] Appl. No.: 09/189,171

[22] Filed: Nov. 10, 1998

[51] Int. Cl.⁷ .............................. G02B 7/02; G02B 1/10; G02B 5/28; F21V 9/06

[52] U.S. Cl. .................... 359/830; 359/580; 359/589; 359/361

[58] Field of Search ................................... 359/577, 580, 359/581, 582, 583, 584, 585, 586, 587, 588, 589, 590, 634, 819, 830, 361

[56] References Cited

U.S. PATENT DOCUMENTS 4,070,101  1/1978  Richards et al. ..................... 350/312
5,753,319  5/1998  Knapp et al. .......................... 427/529

FOREIGN PATENT DOCUMENTS

Wo 96/27451  9/1996  WIPO .

Primary Examiner—Scott J. Sugarman
Assistant Examiner—David N. Spector
Attorney, Agent, or Firm—Peter F. Corless; Lisa Swiszcz Hazzard; Dike, Bronstein, Roberts & Cushman, LLP

[57] ABSTRACT

The present invention provides for significantly improved ultraviolet optical filters. This new class of optical filters benefits from improved optical performance, extended physical longevity, high imaging quality of transmitted radiation, transmitted wavelength stability, and minimal autofluorescence. Preferred filters of the invention do not require any sealing from the ambient, are stable, and do not degrade over time and exposure to UV irradiation, and offer superior transmittance for use as bandpass filters.

15 Claims, 6 Drawing Sheets

HIGH PERFORMANCE OPTICAL FILTERS SUITABLE FOR INTENSE ULTRAVIOLET IRRADIANCE APPLICATIONS

BACKGROUND OF THE INVENTION

1. Field of the Invention

The present invention provides for significantly improved ultraviolet optical filters. This new class of optical filters benefits from improved optical performance, extended physical longevity, high imaging quality of transmitted radiation, transmitted wavelength stability, and minimal autofluorescence.

2. Background

Optical filters and coatings are passive components whose basic function is to define or improve the performance of optical systems. Applications of optical filters and coatings can be diverse as anti-glare computer screens, laser devices such as ophthalmic surgical lasers, sighting devices, etc.

Many applications and instruments exist where optical filters are used to tune the optical behavior of light in the ultraviolet range (typically wavelengths shorter than 340 nm). Some applications include water purification, blood chemistry analysis, and the chemical evaluation of foods, pollutants, gases, etc. As the wavelength of light becomes shorter in the ultraviolet range, prior art optical filters suffer from numerous disadvantages such as: poor optical performance, limited physical longevity, high autofluorescence, very poor imaging quality of transmitted radiation, and transmitted wavelength instability.

Existing state-of-the-art optical coatings employed for ultraviolet applications have been deposited by Physical Vapor Deposition (PVD) technologies which can be classified generally into two general categories: laminated dielectric films and Metal-Dielectric-Metal (MDM) coatings.

Dielectric film technologies include deposition of soft, marginally adherent multilayer thin films onto various glasses. The films are soft and lack physical durability; most films are also water soluble. These films may consist of materials such as lead fluoride, cryolite ($AlF_6Na_3$), zinc sulfide, etc. Coatings also may contain refractory metal oxides which are generally more durable. Yet, standard oxide coatings are physically porous, absorb moisture and therefore are optically unstable when exposed to a varying environment.

To protect these sensitive multilayer optical coatings, they are imbedded into a transparent epoxy by lamination onto other glass substrates. Optical filters made by a soft or hard film deposition include multiple coating layers and laminations, requiring burdensome and relatively costly manufacturing processes. Moreover, the epoxy laminate effectively limits the useful temperature range of the product typically to less than about 100° C. Even more disadvantageously, prior art epoxies discolor and degrade over a short time period when exposed to ultraviolet radiation, rapidly degrading filter optical performance. Additionally, epoxy laminates tend to autofluoresce upon exposure to U.V. radiation. This limited such laminates use in sersitive, critical instrumentation and other sensitive application.

Still further, soft film filters can be sensitive to temperature and humidity and therefore have relatively limited operable lifetimes. Additionally, any laminates will oblate the ability to image through a filter of this type, significantly limiting their application. FIG. 9 depicts the performance of a typical soft-film 340 nm bandpass filter. Curve #1 shows the peak performance of a new filter, with a bandwidth or about 10 nm and transmittance of 35%. Curve #2 is the performance of the same filter after exposure to UV light for 10 hours from a 1500 W mercury arc lamp. As can be readily appreciated, after only 10 hours, transmittance drops to about 3%, or a 91.4% reduction in performance.

The second class of PVD process utilized in the in the prior art to manufacture ultraviolet optical filters employ thin films is designated as MDM (Metal-Dielectric-Metal). MDM filters comprise essentially of a single substrate of fused silica or quartz, upon which a multilayer coating consisting of two materials, a dielectric (e.g. cryolite) and a metal (e.g. aluminum) is deposited. FIG. 10 depicts a simplified cross sectional view of a typical MDM filter 10. As depicted, the filter i:, contained by housing 12, for example of anodized aluminum. A substrate 14, typically of fused silica, is coated with an MDM coating 16. MDM films are soft and easily damaged by moisture and oxygen. The final filter therefore consists of a second fused silica substrate mechanically fixed within a ring assembly with a vacuum or an atmosphere of argon separating the two substrates. A second substrate 18 is provided to define a gap 20, which is evacuated or filled with Argon in order to protect the MDM coating 16. A seal 22 is typically provided to hermetically contain the filter components.

In typical applications, the MDM ultraviolet optical filter is generally a bandpass filter, which will pass a short range of wavelengths and eliminate out-of-band wavelengths by reflection. This type of filter is most commonly employed for shorter UV applications (wavelengths shorter than 300 nm). FIG. 11 depicts the typical spectral behavior of a 270 nm MDM bandpass filter. The property of "induced transmission" governs the optical behavior of the coating. In such a filter, the metal film is induced to transmit energy at a particular design wavelength. See P. H. Berning and A. F. Turner, 47 Journal of the Optical Society of America 230 (1957). MDM filters offer the advantage over soft-coating type filters of eliminating laminating epoxies, thus eliminating performance degradation due to solarization (UV discoloration). The optical performance of MDM filters is, however, rather limited. Typically, the peak transmission of 270 nm to 300 nm bandpass filters is at most about 10–25%. The maximum usable temperature of this filter type is relatively low, typically less than 150° C. If the mechanical filter seal of the filter is in any way violated (physically damaged by use or heat), the filter coating will very rapidly degrade due to the absorption of moisture. Further, if any air is allowed to enter the filter cavity, ultraviolet light exposure will create a small amount of reactive ozone, which will oxidize the coating, rendering the filter unusable.

SUMMARY OF THE INVENTION

The present invention provides improved optical filters that exhibit substantially improved physical properties, including improved optical performance, extended physical longevity, high imaging quality of transmitted radiation, transmitted wavelength stability, and minimal autofluorescence, relative to prior filters.

Preferred filters of the invention do not require any sealing from the ambient atmosphere, in clear distinction from prior filter systems and are stable, do not degrade over time and exposure to UV irradiation, and offer superior transmittance for use as bandpass filters.

More particularly, preferred filters of the invention do not require encapsulation by an epoxy laminate or other material and are suitably produced through an ion plating deposition process of a desired material on a wide variety of optical substrates including those of large area and composed of a glass, plastic, fuse d silica, metal or the like.

Methods of the invention can be employed to produce ultraviolet all-dielectric optical interference multilayer coatings having superior optical and physical properties. Ion plated coatings applied by methods of the invention are strongly adherent to the underlying substrate, are dense, hard and impervious to exposure to various environmental conditions.

The coatings, deposited upon fused silica substrates in an illustrative embodiment, are impervious to moisture and elevated temperatures (up to typically 400° C.). There is no need to physically protect the coatings, a significant improvement over existing state-of-the-art soft coating and MDM type ultraviolet filter constructions.

The process of ion plating, additionally, provides for fully densified, bulk-like properties of the thin film coatings, rendering the coatings permanent. This is a significant improvement over traditional conventional hard-coating techniques (e.g. electron beam evaporation).

The methods employed in making the invention enable production of new classes of optical filters from a single or multiple substrates, including production of optical filters that have increased operating temperatures and resistance to UV radiation. Moreover, optical filters of the invention can be produced economically since costly strategies of prior approaches, such as lamination or use )f environmentally controlled housings, are not required.

The methods of the invention also enable direct deposition of coatings onto colored glasses producing single-substrate image-quality) ultraviolet solar blind filters. Traditionally these types of filters have been manufactured with multiple sheets of glasses and/or crystals (i.e. nickel sulfate). Nickel sulfate based-UV filters, however, are not image quality due to the existence of crystal grains and grain boundaries in the material. Operating temperatures of nickel sulfate-based UV filters are limited to only 85° C. Methods of the present invention, however, enable manufacture of single-substrate fully stabilized UV filters, which are image quality, resistant to environmental exposures and can be used at temperatures exceeding 450° C.

Other aspects of the invention are discussed infra.

DETAILED DESCRIPTION OF THE INVENTION

As discussed above, the preferred filters of the invention do not require any sealing from the ambient atmosphere (e.g. no epoxy or other encapsulation), in clear distinction from prior filter systems, and are stable, do not degrade over time and exposure to UV irradiation, and offer superior transmittance for use as bandpass filters. Such filters are useful for a wide variety of applications, including applications where current filter systems simply can not provide acceptable performance.

For instance, optical filters of the invention will be especially for a variety of analytical devices. In particular, in many biomedical analysis systems, e.g. to detect the presence of a specific marker (e.g. enzyme) in a blood or tissue sample, the marker will be identified by fluorescence upon exposure of the sample to a detection wavelength. The emission from the sample can be accurately detected using a filter of invention that does not autofluoresce. In contrast, prior filters may exhibit significant autofluorescence, such as resulting from the required epoxy lamination of such filters, and that autofluorescence can render the analysis system unreliable or even practically inoperable.

In addition to use as bandpass filters, filters of the invention are also highly useful as dichroic filters.

Figure 1:
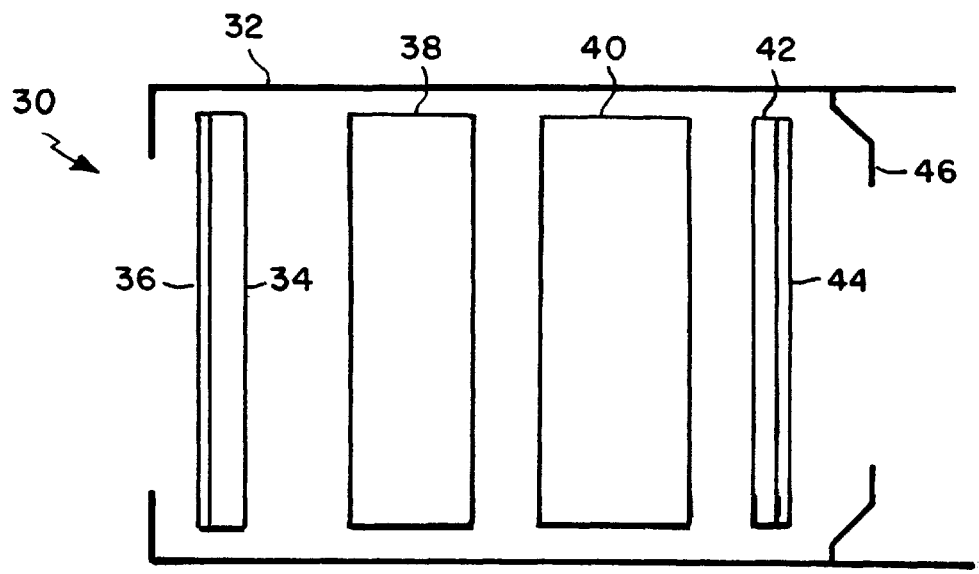
FIG. 1 is a simplified cross sectional view of an ion plated UV filter according to one embodiment of the present invention.

FIG. 1 depicts in simplified cross section an illustrative embodiment of an UV filter 30 according to the instant invention. The filter comprises a housing 32, which can be cylindrical, and is composed of metal, plastic, or other similar material. The housing contains the optical components of the filter. A first and a second optical filter component 34, 42 have deposited thereupon a multilayer optical interference coating 36, 44 deposited by ion plating methods described in greater detail below. Preferred filters of the invention are produced by ion plating deposition of a coating layer on a substrate. The components 34, 42 are each comprised of a substrate, which is substantially transparent and thin, and in an exemplary embodiment is of fused silica. Secondary substrates 38 and 40 can also be provided as shown. These secondary substrates are used for the absorption of various wavelengths of light, and in an exemplary embodiment are colored glass, which may optionally be protected with an ion plating methods described in greater detail below. Each of the optical components inside the housing can be separated by a simple air gap, and there is no requirement for evacuation, hermetic sealing, or packing in inert gas. All of the components can be retained in the housing by a simple retaining ring 46, which can be fashioned of plastic, metal, or similar material.

Figure 2:
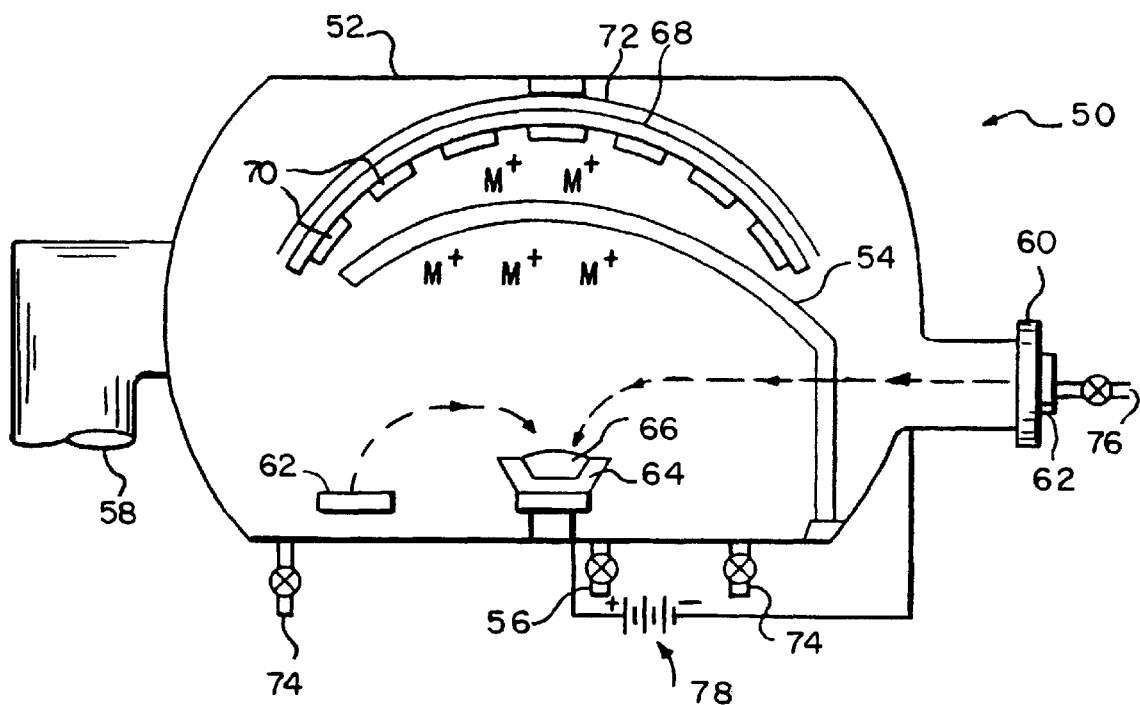
FIG. 2 is a schematic representation of an ion plating apparatus used in making the filters according to another aspect of the invention.

FIG. 2 of the drawings shows a suitable ion-plating coating apparatus of the invention, although it should be clear that other ion-plating systems could be employed. As depicted in FIG. 2, coating apparatus 50 includes an evacuatable coating vessel 52. The vessel 52 can optionally comprise a pretreatment plasma source 54 and a pretreatment gas source, depicted as feed line 56, for introducing a pretreatment gas into vessel 52. The apparatus 50 further comprises an evacuation or vacuum apparatus 58 in communication with vessel 52 for providing a vacuum to vessel 52; a deposition plasma source 60 and one or more electron beam guns 62 which supply electrons of energy directed towards a containment structure 64 (e.g. a copper crucible) that contains the coating material 66. Coating material 66 may be a variety of materials recognized by those skilled in the art, e.g., Si, Tantalum oxide, Ti, $ZrO_2$, $HfO_2$, etc. Multiple containment vessels also may be employed, particularly to apply different materials on a single substrate. For example, to apply alternating layers of two different materials on a substrate (e.g., alternating layers of $Ta_2O_5$ and $SiO_2$), one crucible will contain a first source chemical and a second crucible will hold a second source chemical and the source chemicals will be separately activated by electron guns. Thus, to apply alternating layers of $Ta_2O_5$ and $SiO_2$ on a single substrate, a first containment vessel contains tantalum oxide source chemical and a second containment vessel contains Si. Two separate electron beam guns are used as discussed below. One electron beam gun is directed to the crucible containing the tantalum material, and the second electron beam is directed to the Si-containing crucible. The two electron beams are alternatively operated during the ion-plating deposition step to thereby apply the alternating $Ta_2O_5$ and $SiO_2$ layers on the substrate.

A substrate support structure 68 holds one or more substrates 70 during the coating process and is positioned opposite the containment structure 64. A heating device 72 heats one or more substrates 70 to be coated, and a gas source depicted as dual feed lines 74 allows for the introduction of reactive gases for use during deposition of the coating material. The coating apparatus suitably may be a modified commercially available ion plating coating device, e.g. the BAP 800 Batch ion plating System available from Balzers Aktiengesellschaft (Liechtenstein), which may be optionally modified to include a pretreatment plasma source such as a glow discharge rod 54.

In use, coating vessel 52 is evacuated by vacuum system 58 to provide a base vacuum to the coating vessel such as less than about $3 \times 10^{-6}$ mbar. Vacuum 58 may be an oil diffusion pump with a Roots Blower.

One or more electron beam guns 62 are employed to supply electrons of energy and in use direct an intense electron beam into the containment structure 64 to vaporize the coating material 66 contained therein. Preferably two 270° electron beam guns are employed. Deposition plasma source 60 suitably includes a heated tantalum filament and gas inlet 76. Deposition plasma source 60 is suitably connected to the electrically conductive containment structure through a low-voltage high-current power supply 78.

The electrically insulated substrate support structure 68 is suitably a rotating, elongate, dome-shaped structure as is known in the art suspended from ceiling of vessel 52 as generally illustrated in FIG. 2. The substrate structure 68 also may be of other configurations, e.g., having a substantially flat surface or cone-shaped. As a result of the deposition plasma discharge operated during the coating step, substrates 70 positioned on structure 68 become negatively self-biased and the vaporized coating material ($M^+$ in FIG. 2) activated by the deposition plasma becomes highly energetic, ionized and chemically reactive. This energized material ($M^+$) is attracted to the one or more substrates 70 via electromagnetic coulomb attraction followed by subsequent film deposition.

The coating apparatus preferably also includes a heating device 72 for heating of the substrate(s) to be coated. Suitably a Calrod heater is employed and is positioned above the substrates as generally shown in FIG. 2. Other heating devices such as quartz lamps also may be used.

As discussed above, the coating apparatus also contains a reactive gas source, illustrated as plurality of gas feed lines 74 in FIG. 2, which discharge one or more reactive gases at a position proximate to the containment structure 64 so that an effective density of reactive gas can mix and react with material vaporized from structure 64 during the coating step. A variety of gases such as oxygen, nitrogen, aliphatic and aromatic hydrocarbons (e.g., acetylene, methane, ethane, propylene, benzene, etc.) and others can be introduced into the coating vessel 52 through reactive gas feed line 74 depending on the coating material that is to be deposited. For example, to deposit a $Ta_2O_5$ coating onto a substrate, submetallic tantalum oxide is placed in containment structure 64 and is vaporized therefrom by an electron beam 62; oxygen is simultaneously introduced through lines 74 to provide a reaction effective oxygen partial pressure over the containment structure, e.g., a partial pressure of about $5 \times 10^{-4}$ to about $1 \times 10^{-3}$. Desired pressure within the coating vessel can be maintained by closed loop pressure control or mass flow. The reactive gases are typically continuously feed into vessel 52 during coating to maintain a substantially constant concentration thereof. Additionally, a mixture of reactive gases may be introduced into vessel 52 to produce a coating layer on the one or more substrates 70 of a desired composition. For example, nitrogen and acetylene may be supplied through lines 74 to provide a carbonitride-type coating on the substrates 70. Coating layers of other compositions also may be applied as will be appreciated by those skilled in the art. Multilayer coatings also may be applied, including 40, 50 or 100 or more successive ion-plated coating layers. Thicknesses of coating layers applied in accordance will typically vary from tens of nms per layer to hundreds of nms per layer, depending on applications, as will be appreciated by those skilled in the art.

Specifically preferred deposition conditions of various coating materials may be readily determined empirically based on the present disclosure and have been generally reported previously. As an example, to apply a thin film coating layer of $SiO_2$ onto a substrate, silicon is loaded into copper crucible containment vessel 64. The deposition plasma gas pressure within plasma source is 2.8 mbar; plasma voltage is from 55 to 60 volts; plasma current is from 55 to 60 amps; anode-to-ground voltage is 40 volts; plasma filament current is 110 amps; reactive gas is $O_2$ (introduced through line 54 shown in FIG. 2); and the reactive gas pressure is $1 \times 10^{-3}$ mbar within the coating vessel. The electron beam gun associated with the plasma source is operated at a high voltage of 10 kV, an emission of 400 mA and at a rate of 0.5 nm/second.

As a further example, to apply a thin film coating layer of $Ta_2O_5$ onto a substrate, the source chemical of $Ta_2O_5$ contained within a molybdenum liner is placed in copper crucible containment vessel 64. The deposition plasma gas pressure within the plasma source is 2.8 mbar; plasma voltage is from 55 to 60 volts; plasma current is from 55 to 60 amps; anode-to-ground voltage is 40 volts; plasma filament current is 110 amps; the reactive gas is $O_2$; and the reactive gas pressure is $8 \times 10^{-4}$ mbar within the coating vessel. The electron beam gun associated with the plasma source is operated at a high voltage of 10 kV, an emission of 350 mA and at a rate of 0.3 nm/second.

The coating apparatus 50 suitably may include other devices for the coating step, e.g., cooling water ducts, auxiliary coils for the production of magnetic fields, etc., as are generally known in the art.

In a further aspect, the present invention provides for filters containing coated colored glass secondary substrates 38, 40, including darkly-tinted glass substrates such as black glass substrates, having an ion-plated coating layer. Typical black glass substrates include the UG (particularly UG-1, UG-5 and UG-11) glasses and the RG (particularly RG 750 and RG 850) glasses produced by Schott. Prior to the present invention, such colored glass substrates have proved difficult to coat by prior ion plating methods, and the resultant coatings had poor substrate adherence, rendering the coated substrates unusable for most applications.

It has been found, however, that coating layers applied on colored glass substrates (including the darkly-tinted glasses mentioned above) by the method of the invention (i.e. an ion plated coating) exhibit excellent physical characteristics, including substantial and long lasting adhesion and durability.

Preferred filter systems of the invention include stacks of light transmitting substrates, where one or more of the substrates has an ion plated coating, and the complete stack is not sealed, i.e. one or more of the substrates of the invention is exposed to the atmosphere. For example, preferred filter systems include those containing quartz and glass substrates, preferably where a glass substrate is interposed between the glass substrates. One or more of the quartz substrates may have an ion plated coating (e.g. coatings of $SiO_2/TiO_2$; $SiO_2/Ta_2O_5$; $SiO_2/HfO_2$), with the glass substrate being optionally coated. The glass substrate may be suitably uncoated, or in many instances it will be preferable to coat the glass substrate with protective layer such as $SiO_2$ to enhance the physical durability of the substrate. The multiple substrate assembly can be held together with a brace such as a ring structure, but without the need for sealing from the atmosphere. That is, the substrates can have air gaps between each other.

As discussed above, filters of the invention exhibit exceptional optical properties, including transmittance and minimal autofluorescence. More specifically, preferred filters of the invention include bandpass filters that have an optical transmittance of a desired wavelength of at least about 40%, more preferably at least about 50%, still more preferably at least about 55%, 60% or 65%, and that such transmittance is maintained over extended periods of exposure to intense ultraviolet radiation, e.g. exposure to radiation having a wavelength of from about 150 or 200 nm to 400 nm at energy doses that may typically provided by the following: positioning a filter of the invention from about 0.25 inches to 0.5, 1, 2, 3, 4, 5, 6, 7, or 8 inches away from a mercury or xeon lamp that may be 100, 200, 300, 500, 800, 1000, or 1500 watts, for at least 30 minutes of exposure to such a lamp, more typically at least about 1, 2, 3, 4, 5, 6, 7, 8, 9, 10, 20, 30, 40, 50, 100, 200, 500, 700, 800 or 1000 or more hours of exposure to such a lamp. That is, preferred filters invention do not degrade under such extended exposure to intense ultraviolet light, in contrast to prior filter systems, particularly those prior systems that employ epoxy or other encapsulation.

Preferred filters of the invention also have minimal sideband output during transmittance of radiation through a filter assembly, e.g. less than about 0.1% or 0.01% sideband radiation output, more preferably about 0.001% or less sideband radiation output.

Preferred filters of the invention also exhibit essentially no autofluoresence, e.g. autofluorescence at levels below that which may interfere with analytical use of the filter in a biomedical application as discussed above, or other applications.

As discussed above, coating layers applied onto substrates (including substrates recognized as difficult to coat such as colored glasses and large area substrates where an extended coating layer is applied across the large substrate surface area) exhibit excellent durability to harsh environmental conditions and excellent substrate adherence. More specifically, coatings applied by methods of the invention have withstood 100 or more cycles of high temperature and aggravated humidity per MIL-STD-810E (standard tests; military specification). Following such environmental exposure, the same coatings maintain excellent substrate adherence and pass the snap-cellophane test per MIL-C-48497 (standard test; military specification).

Filters of the invention also may comprise quite large substrates, e.g. ion plated coated substrates that are 4 inches or more in diameter, or even 6 or 6.5 inches in diameter or more.

All documents mentioned herein are incorporated by reference herein in their entirety. The following non-limiting examples are illustrative of the invention. In the Examples, ion plating was conducted using an ion plating apparatus as generally depicted in FIG. 2 above, by procedures disclosed herein as well as in U.S. Pat. No. 5,753,319.

EXAMPLE 1

Two 340 nm bandpass filters of the invention were produced that had sequential substrates of quartz: glass (UG-11 colored glass): quartz and were of the general construction as shown in FIG. 1. Each of the quartz substrates had ion plated coatings that consisted of alternating layers of $SiO_2$ and $Ta_2O_5$. The interposed glass substrate was not coated with an ion plated layer. The substrates of the filter assembly were stacked without sealing, i.e. air gaps existed between the substrates. Performance results of the two filters are set forth in FIGS. 3 and 4.

Transmittance and optical density properties for the two bandpass filters are shown in those figures where optical density is computed as the logarithm of the reciprocal of transmittance. Therefore, an optical density of zero represents 100% transmittance, and an optical density of eight represents a transmittance of $1 \times 10^{-8}$ percent.

Figure 3:
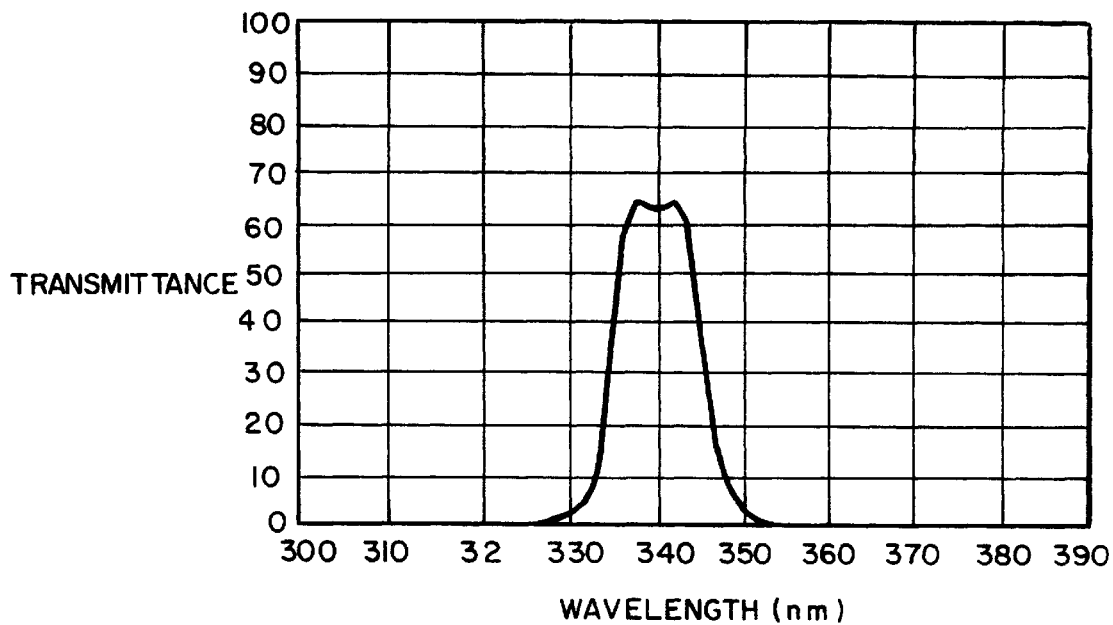
FIG. 3 depicts graphically the spectral behavior of a 340 nm bandpass filter according to the present invention.
Figure 4:
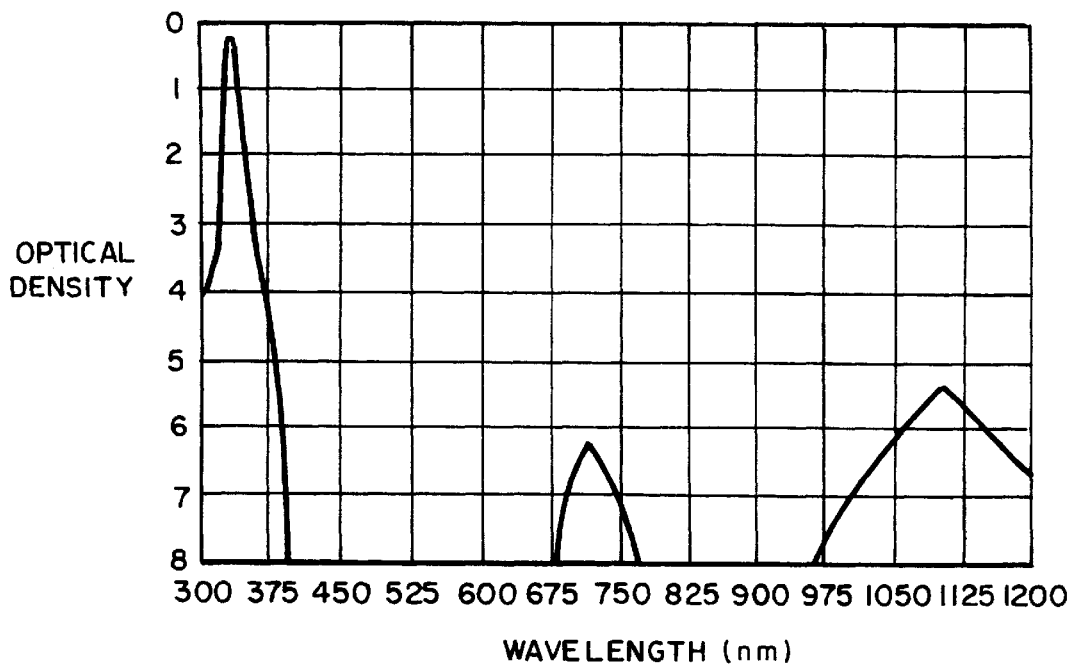
FIG. 4 depicts graphically the optical density of a 340 nm bandpass filter according to the present invention.
Figure 9:
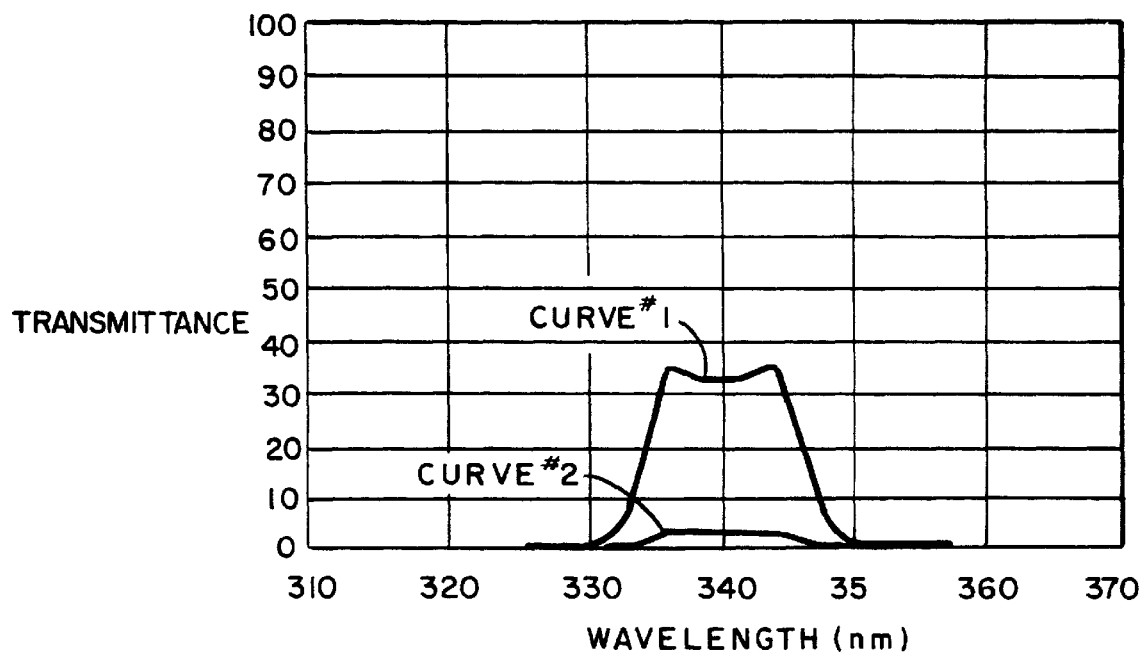
FIG. 9 is graph depicting the spectral behavior of a conventional 340 nm soft film filter before and after exposure to UV irradiation.
Figure 10:
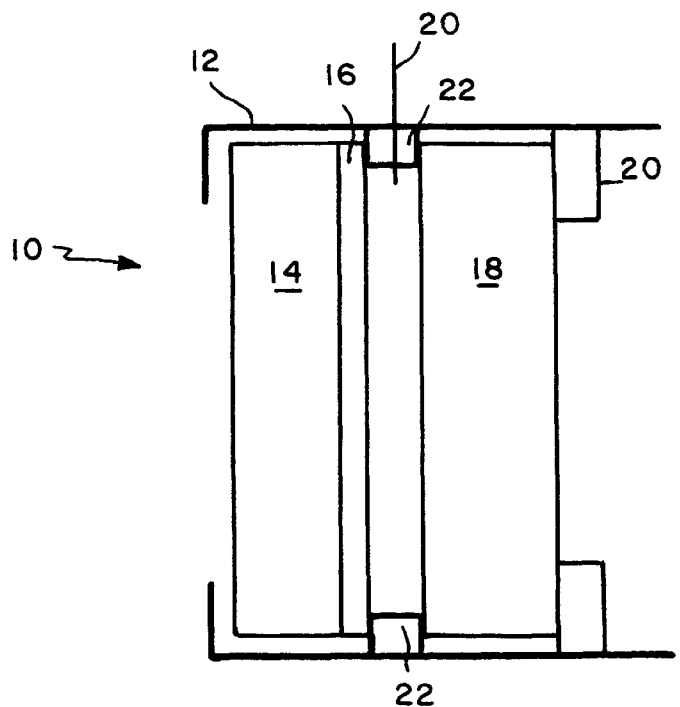
FIG. 10 is a simplified cross sectional view of a conventional MDM-type filter.
Figure 11:
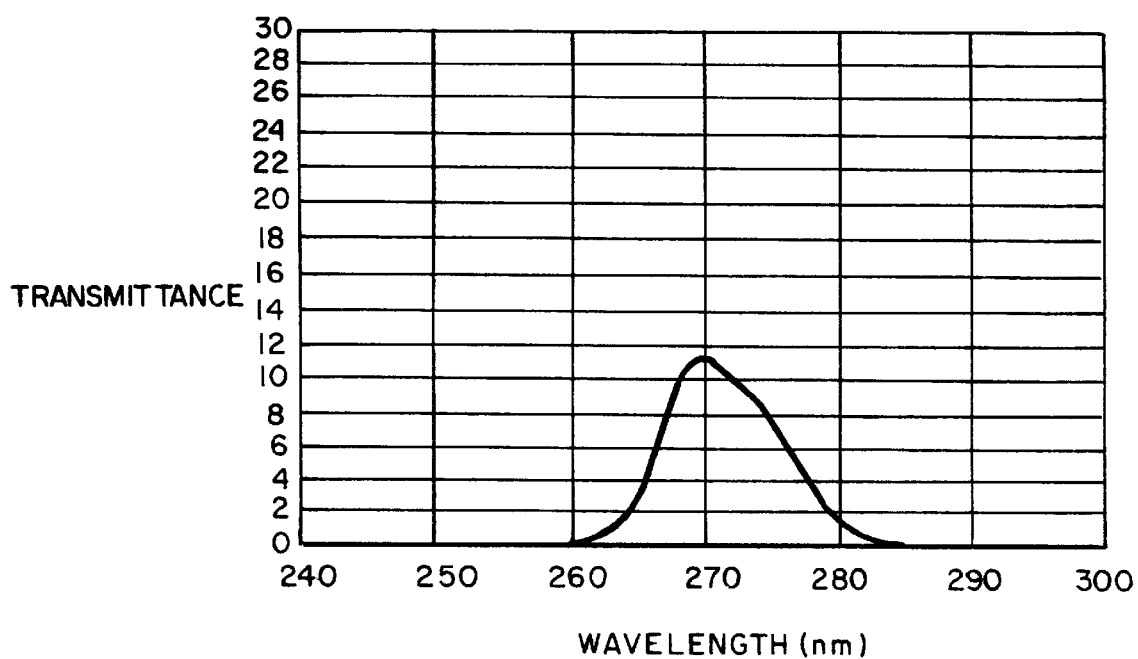
FIG. 11 is a graph depicting the spectral behavior of a conventional 270 nm MDM-type filter.

As seen in FIG. 3, the filter of the invention resulted in a transmittance of about 65%. Compared with the conventional soft-film filter, an initial transmittance of 35% was achieved as shown in FIG. 9, with degradation to around 3% after only 10 hours of exposure. The present invention provides an initial increase in filter output of more than 114%. Because the filters according to the present invention do not appreciably degrade in performance, after ten hours, the ion-plated filters according to the instant invention provide an increase in filter output of more than 2000%.

EXAMPLE 2

Figure 5:
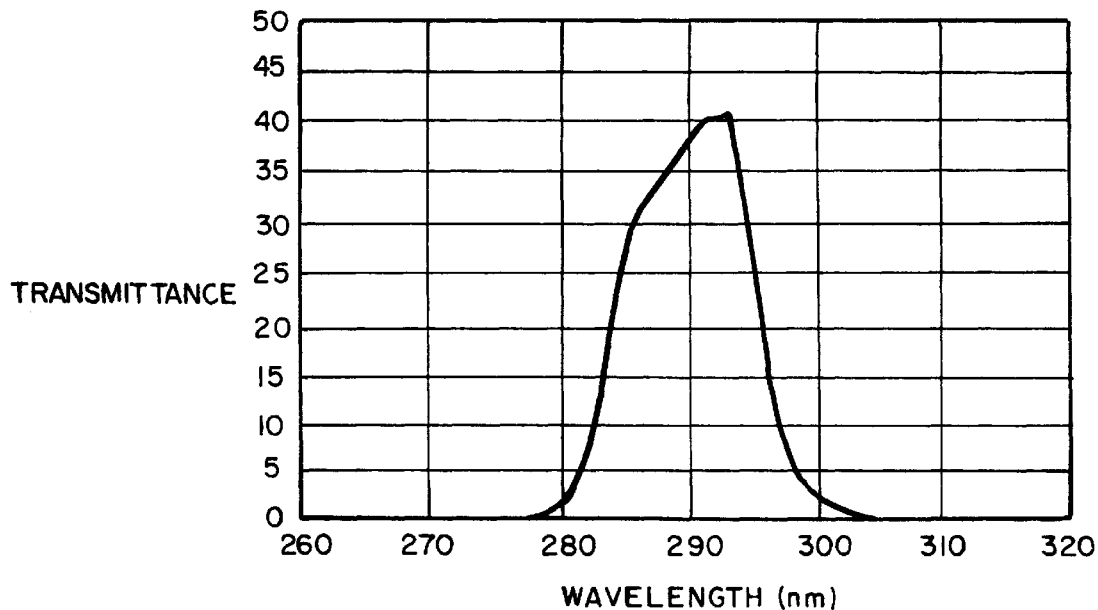
FIG. 5 depicts graphically the spectral behavior of a 290 nm bandpass filter according to the present invention.
Figure 6:
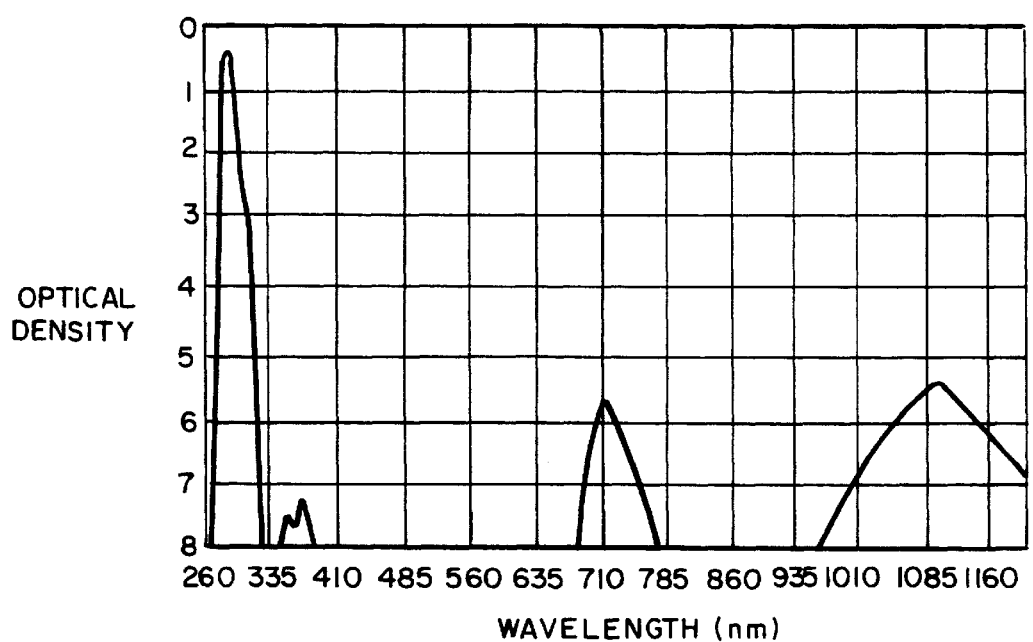
FIG. 6 depicts graphically the optical density of a 290 nm bandpass filter according to the present invention.

FIGS. 5 and 6 depict the transmittance and optical density properties, respectively for a 290 nm bandpass filter according to the present invention. That 290 nm filter had the general construction shown in FIG. 1 and had sequential substrates of quartz: quartz: quartz: glass (UG-11 colored glass): quartz. Each of the quartz substrates had ion plated coatings that consisted of alternating layers of $SiO_2$ and $HfO_2$. The interposed glass substrate was not coated with an ion plated layer. The substrates of the filter assembly were stacked without sealing, i.e. air gaps existed between the substrates. As seen in FIG. 5, transmittance is around 40%. As seen in FIG. 6, sideband output has an optical density of more than five, or less than 0.001%.

EXAMPLE 3

Figure 7:
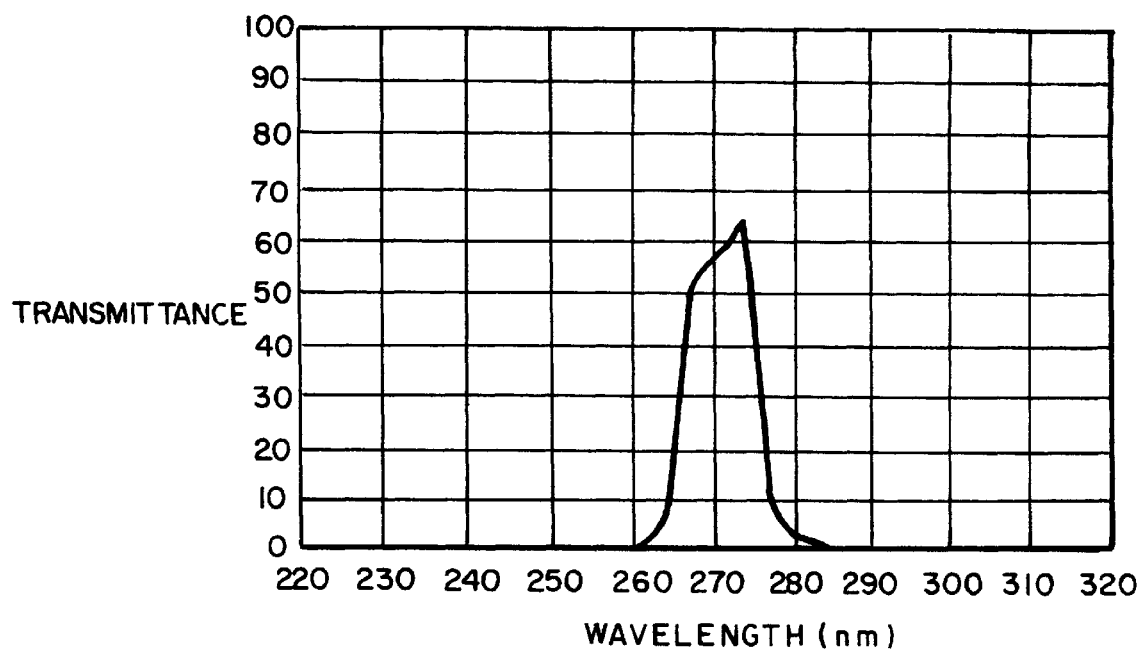
FIG. 7 depicts graphically the spectral behavior of a 270 nm bandpass filter according to the present invention.
Figure 8:
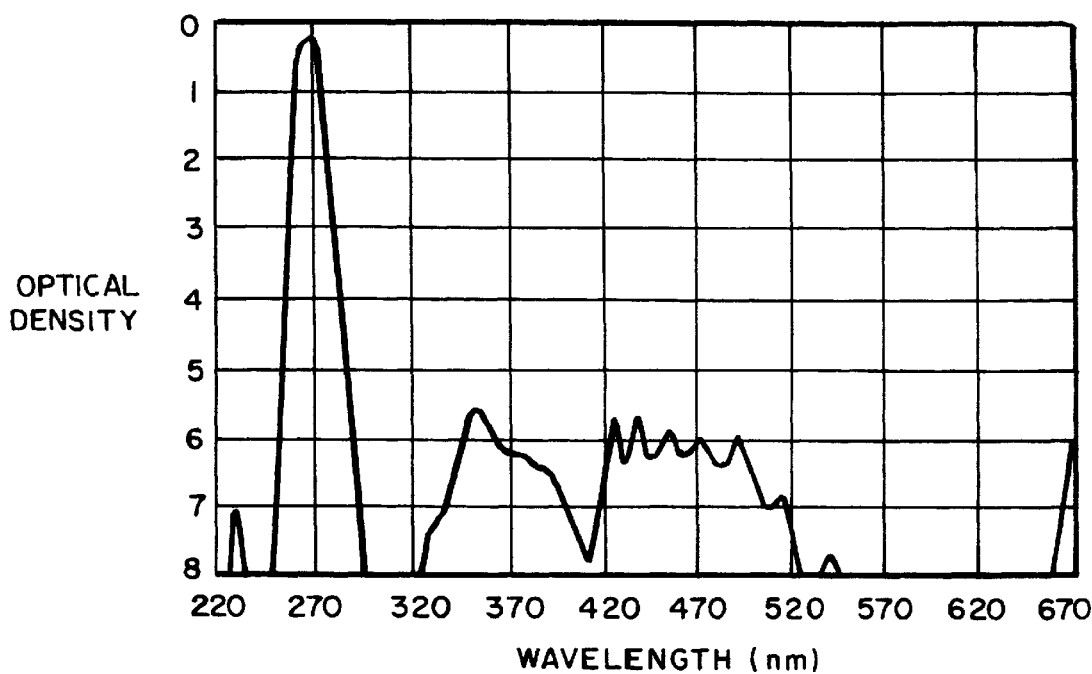
FIG. 8 depicts graphically the optical density of a 270 nm bandpass filter according to the present invention.

FIGS. 7 and 8 depict the transmittance and optical density properties, respectively, for a 270 nm bandpass filter according to the present invention. That 270 nm filter had the general construction shown in FIG. 1 and had sequential substrates of quartz: quartz: quartz: glass (UG-11 colored glass): glass (UG-5 colored glass): quartz. Each of the quartz substrates had ion plated coatings that consisted of alternating layers of $SiO_2$ and $HfO_2$. The interposed glass substrate was not coated with an ion plated layer. The substrates of the filter assembly were stacked without sealing, i.e. air gaps existed between the substrates.

As seen in FIG. 8, transmittance is around 60%. As seen in FIG. 7, sideband output has an optical density of more than five, or less than 0.001%.

The foregoing description of the invention is merely illustrative thereof, and it should be understood that modifications can be affected without departing from the scope or spirit of the invention as set forth in the following claims.

What is claimed is:

1. An ultraviolet optical filter comprising:
    a housing defining a chamber having a first opening and a second opening;
    a first and a second substrate, each having a first side and a second side;
    at least one of said first and second substrates having ion plated coatings deposited so as to form an optical coating on at least said first side of said first and second substrates, whereby said ultraviolet optical filter has an optical transmittance of at least 40% within the ultraviolet wavelength range;
    wherein said optical transmittance does not degrade over extended periods of exposure to UV irradiation, and wherein said first side of said first substrate faces said first opening of said chamber, and said first side of said second substrate faces said second opening of said chamber, the housing is not sealed to the atmosphere.

2. The optical filter of claim 1, further comprising at least one secondary substrate interposed between said second sides of said first and second substrates within said housing.

3. The optical filter according to claim 2, wherein said at least one secondary substrate comprises colored glass.

4. The optical filter of claim 1, wherein said first and second substrates comprise fused silica.

5. The optical filter of claim 3, wherein said first, second, and at least one secondary substrates are separated in the housing by air gaps.

6. The optical filter according to claim 5, wherein the housing is not hermetically sealed.

7. The optical filter according to claim 6, further comprising a retainer ring for holding the first, second, and at least one secondary substrates within the housing.

8. The optical filter according to claim 2, wherein said at least one secondary substrate further comprises an ion plated optical coating.

9. An ultraviolet optical filter comprising:
    a housing defining a chamber having a first opening and a second opening;
    a substrate, having a first side and a second side;
    said substrate having at least one ion plated coating deposited so as to form an optical coating on at least said first side of said substrate, whereby said ultraviolet optical filter has an optical transmittance of at least 40% within the ultraviolet wavelength range and whereby said ultraviolet optical filter has sideband output of no greater than about 0.1% during transmittance of radiation;
    wherein said first side of said substrate faces said first opening of said chamber, and said second side of said substrate faces said second opening of said chamber.

10. The optical filter of claim 9, further comprising at least one secondary substrate interposed between one of said first or second sides of said substrates and one of said first or second openings of said housing.

11. An ultraviolet optical filter comprising a stack of multiple light transmitting substrates, at least one of the substrates of the stack having an ion plated coating thereon, the stack not being sealed to the atmosphere, said ultraviolet optical filter having an optical transmittance of at least 40% within the ultraviolet wavelength range and said optical transmittance does not degrade over extended periods of exposure to UV irradiation.

12. The optical filter of claim 11 wherein at least one of the substrates is quartz and at least one of the substrates is glass.

13. The optical filter of claim 11 wherein a glass substrate is interposed between at least one quartz substrate on either side of the quartz substrate.

14. The optical filter of claim 13 wherein at least one of the quartz substrates has an ion plated deposited optical coating on a surface thereof.

15. The optical filter of claim 14 wherein the quartz substrate has an ion plated coating that is $SiO_2/TiO_2$, $SiO_2/Ta_2O_5$ or $SiO_2/HfO_2$.

* * * * *